United States Patent
Stewart (10) Patent No.: US 6,850,811 B1
(45) Date of Patent: Feb. 1, 2005

(54) ANALYZING ERROR SIGNALS BASED ON FAULT DETECTION

(75) Inventor: Edward C. Stewart, Buda, TX (US)

(73) Assignee: Advanced Micro Devices, Inc., Austin, TX (US)

(*) Notice: Subject to any disclaimer, the term of this patent is extended or adjusted under 35 U.S.C. 154(b) by 318 days.

(21) Appl. No.: 10/085,829

(22) Filed: Feb. 28, 2002

(51) Int. Cl.[7] .............................. G06F 19/00
(52) U.S. Cl. .................. 700/110; 714/2; 438/12
(58) Field of Search ...................... 700/121, 110; 438/10, 12, 14; 714/2

(56) References Cited

U.S. PATENT DOCUMENTS

| | | | | |
|---|---|---|---|---|
| 5,341,304 A | * | 8/1994 | Sakamoto et al. | 700/110 |
| 5,940,300 A | * | 8/1999 | Ozaki | 700/121 |
| 5,991,699 A | * | 11/1999 | Kulkarni et al. | 702/83 |
| 6,246,787 B1 | * | 6/2001 | Hennessey et al. | 382/141 |
| 6,701,204 B1 | * | 3/2004 | Nicholson | 700/121 |
| 6,763,130 B1 | * | 7/2004 | Somekh et al. | 382/145 |
| 2003/0083754 A1 | * | 5/2003 | Tripathi et al. | 700/2 |

* cited by examiner

*Primary Examiner*—Leo Picard
*Assistant Examiner*—Alexander Kosowski
(74) *Attorney, Agent, or Firm*—Williams, Morgan & Amerson, P.C.

(57) ABSTRACT

A method and system are provided for analyzing error signals based on fault detection. The method comprises detecting a fault associated with a processing of a workpiece in a manufacturing system having a plurality of processing tools, identifying at least one of the processing tools that processes the workpiece, and providing an error signal to the at least one of the identified processing tools to perform diagnostics based on the detected fault.

26 Claims, 4 Drawing Sheets

ANALYZING ERROR SIGNALS BASED ON FAULT DETECTION

BACKGROUND OF THE INVENTION

1. Field of the Invention

This invention relates generally to a semiconductor fabrication process, and, more particularly, to analyzing error signals based on fault detection in the semiconductor fabrication process.

2. Description of the Related Art

There is a constant drive in the semiconductor industry to increase the quality, reliability, and throughput of integrated circuit devices such as microprocessors, memory devices and the like. This drive is fueled by consumer demands for higher quality computers and electronic devices that operate more reliably.

These demands by the consumer have resulted in some improvements in the fir manufacture of semiconductor devices as well as in the manufacture of integrated circuit devices incorporating such semiconductor devices. Reducing the defects in the manufacture of these devices lowers the cost of the devices themselves. Accordingly, the cost of the final product incorporating these devices is also reduced, thus providing inherent monetary benefits to both the consumer and manufacturer.

The semiconductor manufacturing processes have become more reliable and robust over the past few years. In fact, today's semiconductor manufacturing processes may include an intricate network of multiple processing tools for manufacturing semiconductor devices. While the benefits of linking multiple processing tools are inherently obvious, there can, however, be some drawbacks, particularly from the standpoint of troubleshooting problems or faults. That is, determining the source of a fault that occurs during the semiconductor manufacturing process may prove to be challenging, as the fault may have occurred in any one of the several processing tools that operate on the semiconductor device along the way. Failing to identify the source of the problem expeditiously may naturally delay any potential corrective measures that can be taken to address the problem. Because of these delays, the operation of the semiconductor manufacturing process may be adversely affected, thereby resulting in a potential increase in costs for the manufacturer and consumer.

The present invention is directed to overcoming, or at least reducing the effects of, one or more of the problems set forth above.

SUMMARY OF THE INVENTION

In one aspect of the present invention, a method is provided for analyzing error signals based on fault detection. The method comprises detecting a fault associated with a processing of a workpiece in a manufacturing system having a plurality of processing tools, identifying at least one of the processing tools that processes the workpiece, and providing an error signal to the at least one of the identified processing tools to perform diagnostics based on the detected fault.

In another aspect of the present invention, an equipment interface is provided for analyzing error signals based on fault detection. The equipment interface of a processing tool comprising a storage unit and a control unit that is communicatively coupled to the storage unit. The control unit is adapted to receive an error signal provided by a fault detection unit, wherein the error signal is indicative of an error condition associated with the processing tool of a manufacturing system, access information related to the error condition from a central database, and determine a possible cause of the error condition based on the accessed information.

In a further aspect of the present invention, a system is provided for analyzing error signals based on fault detection. The system comprises a plurality of processing tools adapted to process a lot of wafers, a fault detection data processing unit communicatively coupled to the plurality of processing tools over a framework. The fault detection data processing unit is adapted to receive the metrology data based on the lot of wafers processed by at least one of the processing tools, detect a fault based on the received metrology data and identify one or more of the plurality of processing tools that processed the lot of wafers. The fault detection data processing unit is adapted to further provide an error signal to the one or more of the identified processing tools based on the detected fault.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
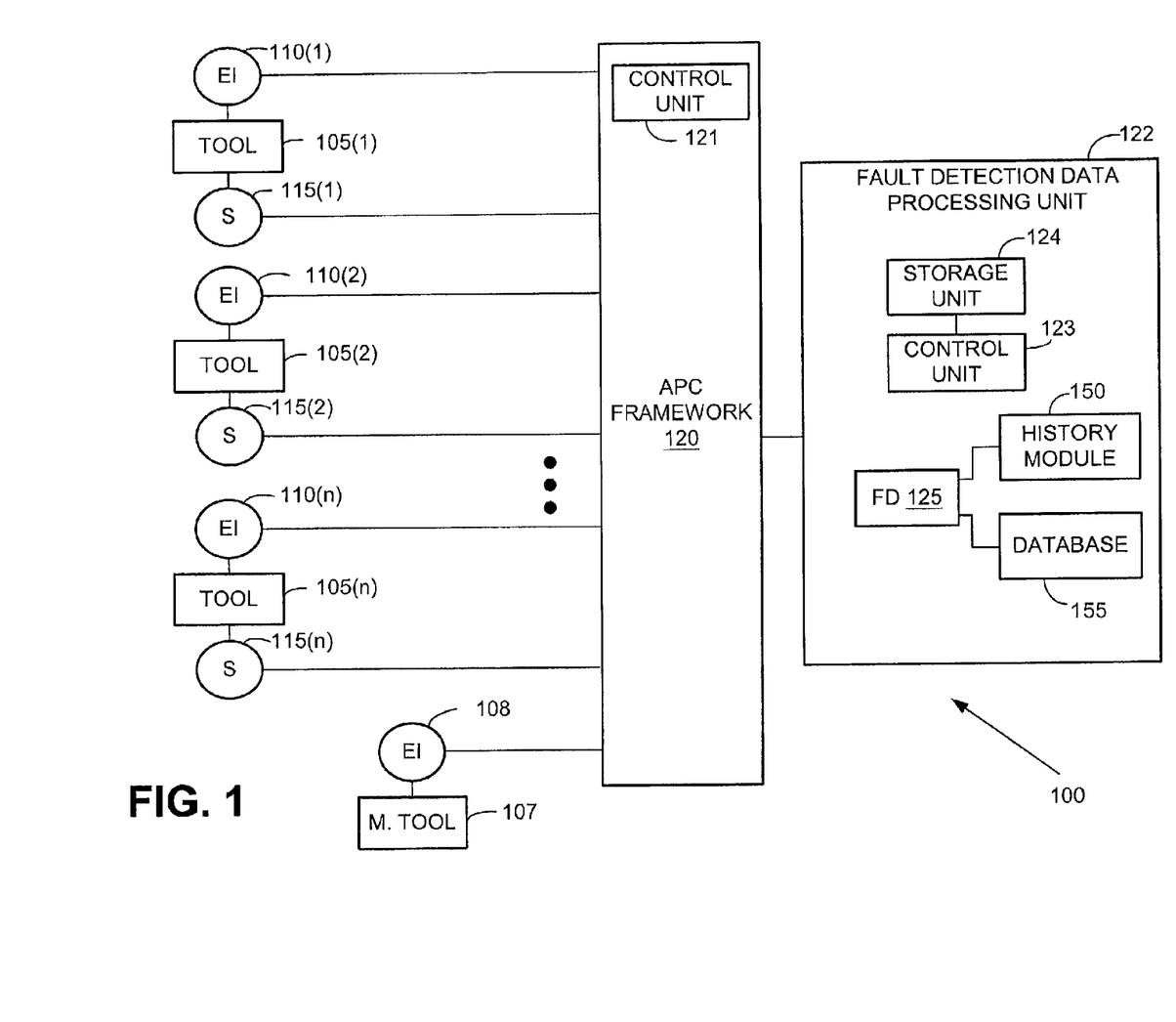
FIG. 1 illustrates a manufacturing system, including an APC framework, for detecting a fault caused by a processing tool in accordance with one embodiment of the present invention.

Turning now to the drawings, and specifically referring to FIG. 1, a block diagram of a manufacturing system 100 is illustrated in accordance with one embodiment of the present invention. The system 100 includes a plurality of processing tools 105 (shown as tools 105(1-n) in FIG. 1). The processing tools 105 in the illustrated embodiment may be in the form of semiconductor fabrication equipment used to produce and process semiconductor material, such as silicon wafers. It will be appreciated, however, that the processing tools 105 need not necessarily be limited to the production of silicon wafers, but could include other types of manufacturing equipment for producing a variety of different types of commercial products without departing from the spirit and scope of the present invention.

In one embodiment, the processing tools 105 may be downstream to each other (e.g., the second processing tool 105(2) may be downstream to the first processing tool 105(1), the third processing tool 105(3) may be downstream to the second processing tool 105(2), and so forth). As such, a group of workpieces (hereinafter referred to as a "lot of wafers") that are processed by the first processing tool 105(1) may, for example, be provided to the second processing tool 105(2), which may further process the lot of wafers before it is processed by the next processing tool 105(3). This process may continue until the last processing tool 105(n) has completed processing the lot of wafers. In one embodiment, the processing tools 105 may include one or more chambers (not shown) where each chamber may perform any one or more of the desired processing steps.

The processing tools 105 of the system 100, in one embodiment, may perform various processing steps to create a packaged semiconductor device. For example, the processing tools 105 may be used for manufacturing the raw semiconductor material, slicing the semiconductor crystal ingot into individual wafers, fabricating (e.g. etching, doping, ion implanting) the wafers and testing and packaging the completed semiconductor devices. The number of processing tools 105 employed in the system 100 may be implementation specific, and thus may vary from one embodiment to another depending on the particular processing steps desired.

For the purposes of this discussion, the term "processing tool" refers to a tool that is capable of performing one or more processing steps, including a metrology tool for testing i and measuring devices. Thus, in a multi-chambered processing tool 105, each chamber may represent a "processing tool."

Generally, the processing tools 105 perform selected processing steps in accordance with a recipe defined for each particular processing tool 105. In one embodiment, the processing tool 105 may have more than one recipe associated therewith. For example, a processing tool 105 having multiple chambers may employ multiple recipes, one for each chamber.

In the illustrated embodiment, the manufacturing system 100 includes a metrology tool 107 that is adapted to provide metrology data through an equipment interface 108 based on the lot of wafers received by the metrology tool 107. The metrology tool 107 may measure a variety of parameters related to the wafers that have been processed by the processing tools 105. For example, the metrology tool 107 may measure critical dimensions, layer-to-layer overlay, film thickness, and the like. As described in more detail below, based on the metrology data, one or more faults may be determined in the processing tools 105. The term "fault," as utilized herein, refers to any undesirable condition or error condition occurring in one or more of the processing tools 105.

In the illustrated embodiment, the processing tools 105 are coupled to respective equipment interfaces (EI) 110 (shown as EI 110(I-n) in FIG. 1). Each equipment interface 110 retrieves various operational data from its respective processing tool 105, and communicates this data to an Advanced Process Control (APC) framework 120 to determine whether the processing tool 105 is experiencing a faulty operation. Each equipment interface 110 may further receive control signals from the APC framework 120 that may be used to control the respective processing tool 105. For example, as explained more fully below, a control signal from the APC framework 120 may be used to cause the equipment interface 110(1) to diagnose the source or cause of an error condition within the processing tool 105(1) associated with that equipment interface 110(1).

In one embodiment, depending on the nature of the fault or the error condition, the A=equipment interface 110 takes corrective action to substantially cure the problem in the processing tool 105. Generally, each equipment interface 110 is designed to interface with its respective processing tool 105. As described in more detail below, one or more embodiments of the present invention distribute the task of analyzing and debugging error conditions, such that processing tool 105. Because the equipment interface 110 is typically designed to interface with a particular processing tool 105, the equipment interface 110 may be better equipped in some instances to analyze and debug error conditions for that particular processing tool 105.

The APC framework 120 may be any one of a variety of arrangements that facilitates communications to and from the processing tools 105. In one embodiment, the APC framework 120 may include a control unit 121 that manages the communications to and from the APC framework 120. The control unit 121 may also control the overall operations of one or more of the processing tools 105.

In the illustrated embodiment, the processing tools 105 are coupled to respective sensors 115 (shown as sensors 115(1-n) in FIG. 1). The sensors 115 measure additional operational data that may not be ascertained by the associated processing tool 105 itself. For example, the sensors 115 may be used to determine a temperature range or other environmental or ambient data near or around the associated processing tool 105. In alternative embodiments, the sensors 115 may be used to sense various other operational parameters, and, thus, need not be limited to the aforementioned examples.

The sensor 115 may be embodied as a simple data acquisition program, such as a C++ standalone program acquiring data from a thermocouple wire, for example. Alternatively, the sensor 115 may be embodied as a full-fledged LABVIEW application, acquiring data through multiple transducers (not shown). It will further be appreciated that the sensor 115 need not be used at all, and the APC framework 120 may rely upon the operational data forwarded from the equipment interface 110. If used, in one embodiment, the sensor 115 forwards the additional operational data to the APC framework 120 for analysis.

The system 100 includes a fault detection data processing unit 122 having a control unit 123 and a storage unit 124. The fault detection data processing unit 122, which in the illustrated embodiment includes a fault detection (FD) module 125, receives data from one or more of the processing tools 105, the sensors 115, and the metrology tool 107 and determines if a fault has occurred in one or more of the processing tools 105. The term "module," as utilized herein, may refer to elements that are implemented in hardware, software, or a combination thereof.

A fault may be generated in one of a variety of ways. For example, in one embodiment, the fault detection module 125 may determine that a fault has occurred based on the metrology data provided by the metrology tool 107. If the received metrology data, such as measured critical dimensions, are not within an acceptable operational range, for instance, the fault detection module 125 may generate a fault. In an alternative embodiment, as is described below in more detail, the fault detection module 125 may generate the fault based on the operational data that is provided by the processing tools 105 or the sensors 115.

The fault detection module 125 compares the received operational data from the APC framework 120 to fault model data. The fault model data includes operational data of other similar-type tools, where it was known that such tools previously operated within acceptable operational limits. The types of faults that may be detected by the fault detection module 125 include processing and/or operational faults in silicon wafer fabrication. Examples of processing faults may include, but are not necessarily limited to, non-optimal preheating of the chamber, catastrophic failure where a broken wafer is detected, abnormal nitrogen (N2) flow rate, temperature overshoots at the top of a ramp, tube temperature measurement drifts, etc. Examples of operational faults detected by the fault detection module 125 may include interrupted/resumed processing, no wafer sleuth or improper wafer sleuth prior to Rapid Thermal Anneal (RTA), etc. As mentioned, the detected faults, whether they are processing or operation faults, may be caused by events that are substantially independent of the processing tool 105, events that may include, but are not limited to, an error in delivery of resource supplies to the processing tool 105 and undesirable ambient conditions external to the processing tool 105.

The fault detection data processing unit 122, which is coupled to the APC framework 120, receives the operational data of the processing tool 105 from the equipment interface 110 and/or sensor 115 via the APC framework 120. In one embodiment, the operational data provided to the fault detection data processing unit 122 via the APC framework 120 may include a date and time stamp that may be utilized by the fault detection module 125 to determine at least an approximate (if not substantially the exact) time and date the fault occurred in the processing tool 105. Prior to sending the operational data to the fault detection data processing unit 122, the APC framework 120 may, in one embodiment, translate the operational data to a format that is recognizable by the fault detection data processing unit 122 in a manner that is well known to those of ordinary skill in the art. In an alternative embodiment, the fault detection data processing unit 122 may be integrated into the APC framework 120, and, as such, the translation of the operational data to a format that is recognizable by the fault detection data processing unit 122 may not be necessary.

In accordance with one embodiment of the instant invention, the fault detection module 125 includes a commercially available software package, such as ModelWare, for example, that provides fault detection analysis of the processing tools 105. It will be appreciated, however, that other types of commercially available fault detection software may also be used in lieu thereof without departing from the spirit and scope of the present invention.

In the illustrated embodiment, the fault detection data processing unit 122 includes a history module 150 and a database 155. The history module 150 includes a compilation of information associated with the processing of a lot of wafers. The information may include the route that the lot of wafers traverse through the processing tools 105, and thus may include information identifying the various processing tools 105 that process the lot of wafers, chambers within the processing tool 105 that process the lot of wafers, and the like. In one embodiment, the history module 150 may contain processing information on a wafer by wafer (as opposed to a lot by lot) basis, if desired. The information stored in the history module 150 may be provided by each equipment interface 110 of the processing tool 105 that processes the lot of wafers. In one embodiment, the information may be provided to the history module 150 by the processing tool 105 on a substantially real-time basis. In an alternative embodiment, the history information may be manually pre-stored in the history module 150 by a system administrator.

The database 155 of the fault detection data processing unit 122, in the illustrated embodiment, may include classification of one or more faults that are detected by the fault detection module 125. Faults may be classified, for example, by associating a particular fault with a particular processing tool 105 that may have caused that fault. For example, if a lot is at a poly final etch inspection, and the measured critical dimensions are smaller than desired, then this error condition may be attributed by a system engineer to a variety of processing tools 105 that may have processed that lot earlier. As such, the detected fault may be classified as (or associated with) a fault that may have been caused by a deposition tool that initially laid the poly, or an etching tool that performed the poly etch step, or the photo tool that laid the pattern. Similarly, over time, a variety of other detected faults may be classified and stored in the database 155. In one embodiment, the classification of faults may include information identifying a corrective action that may be taken to cure the fault. Additionally, in one embodiment, the classification of faults may include information identifying various operational parameters or settings of the processing tool 105 that may need to be monitored or adjusted.

It should be appreciated that the illustrated components shown in the block diagram of the system 100 in FIG. 1 are illustrative only, and that, in alternative embodiments, additional or fewer components may be utilized without deviating from the spirit or scope of the invention. For example, in one embodiment, the one or more of the processing tools 105 may not have an associated sensor 115. Additionally, it should be noted that although various components, such as the equipment interface 110 of the system 100 of FIG. 1 are shown as stand-alone components, in alternative embodiments, such components may be integrated into the processing tool 105. Similarly, the fault detection data processing unit 122 may be integrated into the APC framework 120. In one embodiment, the metrology tool 107 may communicate with the APC framework 120 without an associated intervening equipment interface 108.

Figure 2:
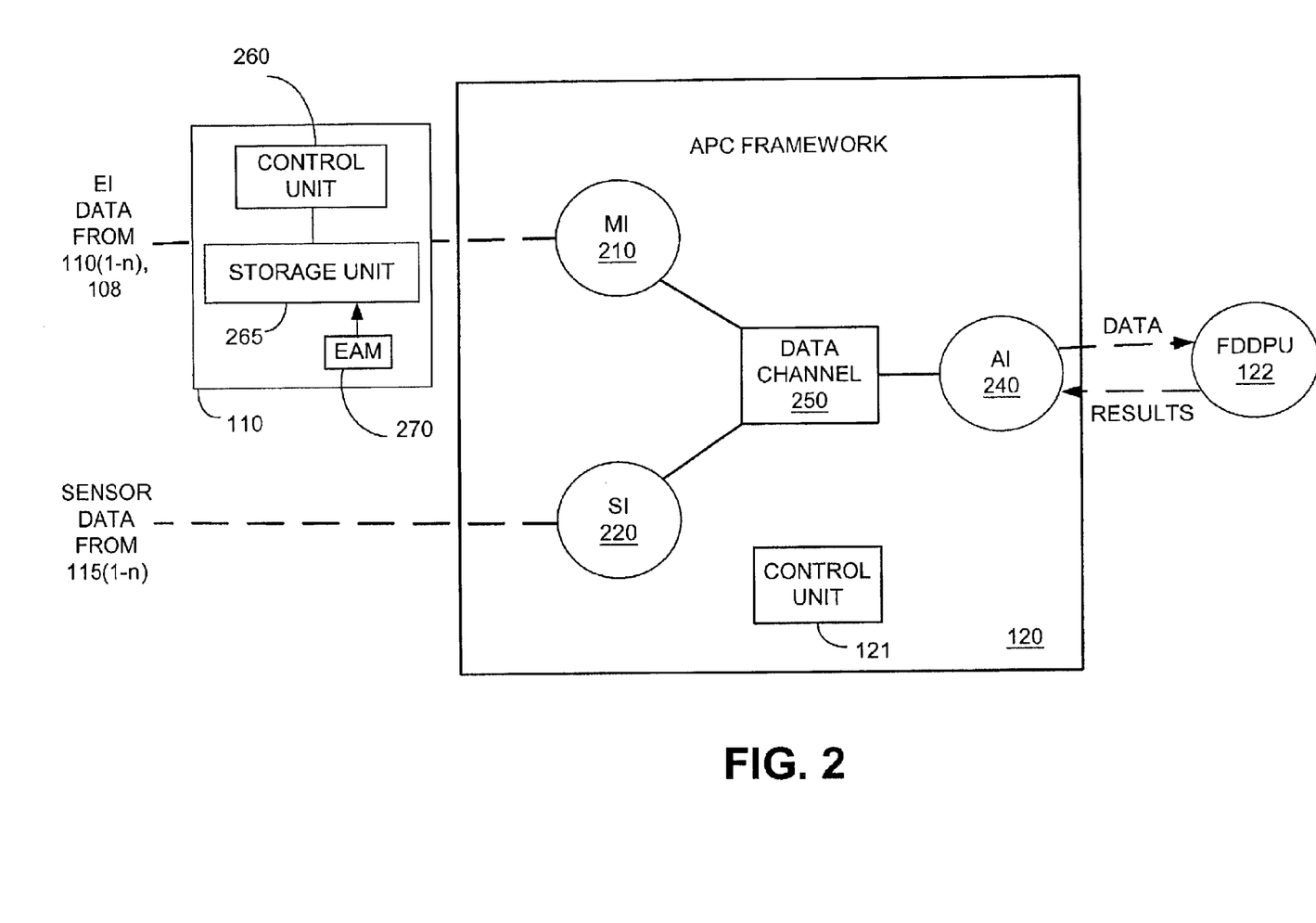
FIG. 2 depicts a detailed block diagram of the APC framework of FIG. 1, in accordance with one embodiment of the present invention.

Turning now to FIG. 2, a more detailed representation of the APC framework 120 is provided. The APC framework 120 is a component-based architecture comprised of interchangeable, standardized software components enabling run-to-run control and fault detection of the processing tool 105. The APC framework 120 includes a machine interface (MI) 210 for communication with the processing tool 105 and the APC framework 120 to collect operational data therefrom. The APC framework 120 further includes a sensor interface (SI) 220 for communication between the sensor 115 and the APC framework 120. 25 The sensor interface 220 also collects operational data of the processing tool 105 through the sensor 115. The APC framework 120 further includes an applications interface (AI) 240 for interfacing with third-party applications that run on the fault detection module 125 to analyze the operational data received via the machine and sensor interfaces 210, 220. In the illustrated embodiment, the third-party application is the fault detection data processing unit 122. A data channel 250 is further provided to allow for communication of data from the machine and sensor interfaces 210, 220 and the applications interface 240 of the APC framework 120.

The machine interface (MI) 210 couples to the equipment interface 110 to serve as an interface between the processing tool 105 and the APC framework 120. The machine interface 210 supports the setup, activation, monitoring, and data collection of the processing tool 105. The machine interface 210 receives commands, status events, and collected data from the equipment interface 110 and forwards this information to other components of the APC framework 120, namely the applications interface 240. Any responses that are received by the machine interface 210 from the other components of the APC framework 120 are routed to the equipment interface 110 for delivery to the processing tool 105. As previously discussed, this may include a control signal from the fault detection data processing unit 122 (see FIG. 1) to manipulate the processing tool 105 if a faulty condition is detected.

The machine interface 210 may also reformat and restructure the messages between the specific communications protocol utilized by the equipment interface 110 and the Common Object Request Broker Architecture Interface Definition Language (CORBA IDL) communications protocol used by the components of the APC framework 120. The manner in which the machine interface 210 performs such translation between the equipment interface-specific communications protocol and the CORBA IDL protocol of the APC framework 120 is well known to those of ordinary skill in the art. Accordingly, the specific translation process between these two formats will not be discussed herein to avoid unnecessarily obscuring the present invention.

FIG. 2 illustrates one embodiment of the equipment interface 110 that communicates with the machine interface 210 of the APC framework 120. The equipment interface 110 includes a control unit 260 that is communicatively coupled to a storage unit 265. In one embodiment, an equipment analyzing module (EAM) 270 may be storable in the storage unit 265 and may be executable by the control unit 260. The equipment analyzing module 270 of the equipment interface 110 is adapted to receive the error signal from the fault detection data processing unit 122 and analyze one or more problems in the processing tool 105 associated with the equipment interface 110. In one embodiment, the equipment analyzing module 270 may diagnose a cause of a problem that was detected by the fault detection data processing unit 122, and, depending on the nature of the problem, may make appropriate adjustments to cure the problem. The equipment analyzing module 270 is discussed in more detail below.

The sensor interface 220 is coupled to the sensor 115 and serves as an interface between the sensor 115 and the APC framework 120. The sensor interface 220 provides setup, activation, monitoring, and data collection for the sensor 115. Similar to the machine interface 210, the sensor interface 220 may also reformat and restructure the messages between the specific communications protocol utilized by the sensor 115 and the CORBA DL protocol used by the components of the APC framework 120.

The applications interface 240 supports the integration of third-party tools (e.g., commercial software packages, such as ModelWare, MatLab, and Mathematica, for example) to the APC framework 120. Typically, these third-party tools do not provide the standard CORBA IDL protocol known to the APC framework 120; accordingly, the applications interface 240 provides the necessary translation between the communications protocol utilized by the third-party tool and the CORBA protocol used by the APC framework 120.

Figure 3:
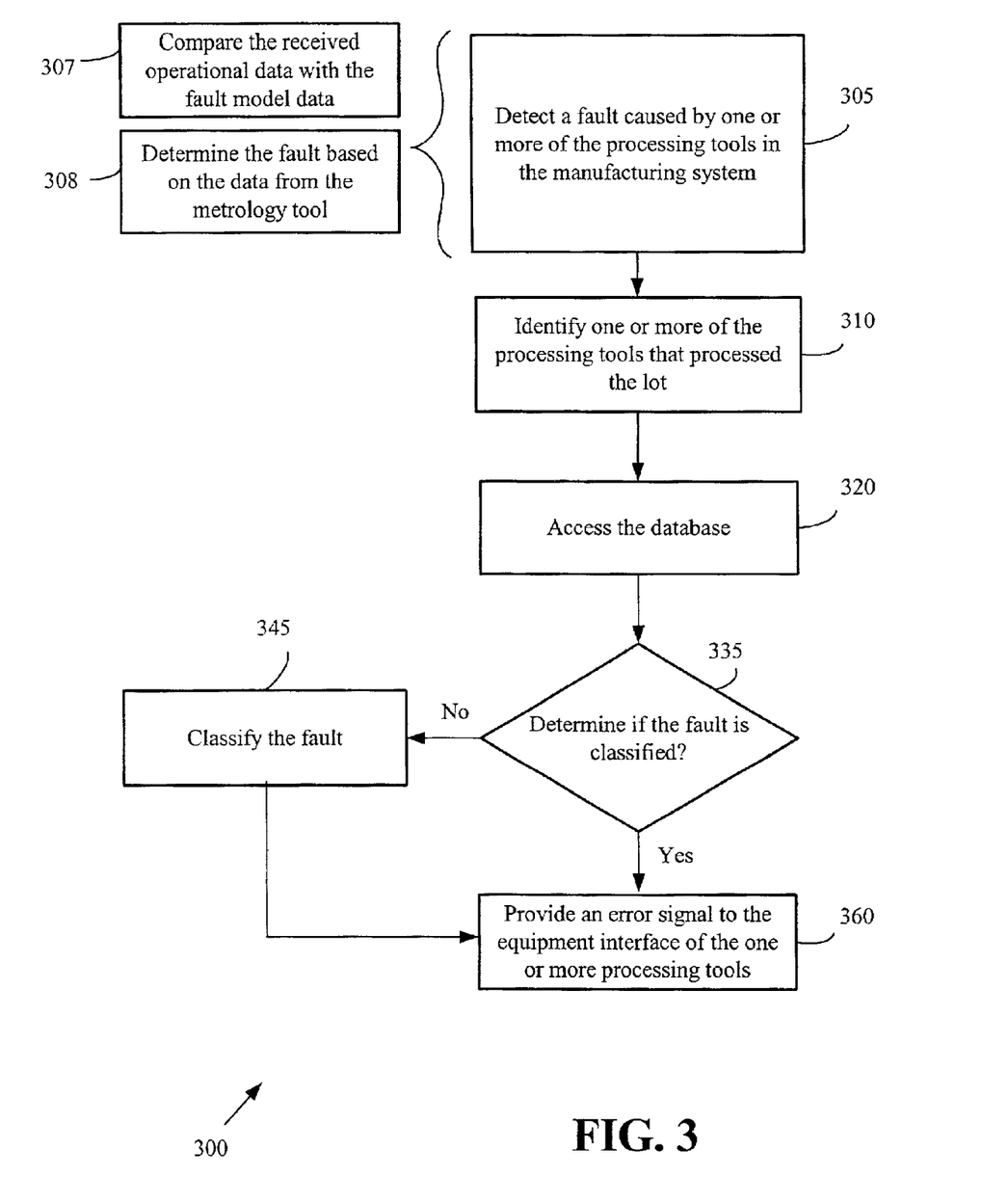
FIG. 3 illustrates a flow diagram of a method that may be implemented in the manufacturing system of FIG. 1, in accordance with one embodiment of the present invention.

Referring now to FIG. 3, a flow diagram of a method that may be implemented in the manufacturing system 100 of FIG. 1 is illustrated, in accordance with one embodiment of the present invention. For ease of illustration, the method 300 of FIG. 3 is described in the context of the processing tools 105 processing a lot of wafers, although the method 300 of FIG. 3 may also be applicable in the context of processing individual wafers or other workpieces. The fault detection module 125 detects (at 305) a fault caused by one or more of the processing tools 105 based on a lot of wafers that is processed by the processing tools 105.

Detecting the fault (at 305), in one embodiment, may include determining the fault (at 307) based on comparing the operational data (related to the processed lot of wafers) received from the processing tools 105 or sensors 115 to fault model data. In an alternative embodiment, detecting the fault (at 305) may include determining the fault (at 308) based on determining whether the metrology data (based on the processed lot of wafers) that is provided by the metrology tool 107 is within acceptable operational parameters.

The fault detection module 125 identifies (at 310) one or more of the processing tools 105 that processed the lot of wafers as it moved through the manufacturing system 100 of FIG. 1. The fault detection module 125, in the illustrated embodiment, identifies (at 310) the one or more processing tools 105 that processed the lot of wafers based on the information stored in the history module 150. As mentioned, the history module 150 includes a compilation of information associated with the processing of the lot of wafers, where the information may, for example, include information related to the route that the lot of wafers take during processing. The history module 150 thus may include a list of processing tools 105 that processed that particular lot of wafers.

The fault detection module 125 accesses (at 320) the database 155, which, as mentioned, contains one or more classifications of faults that are detected in the manufacturing system 100. The fault detection module 125 determines (at 335) if the fault that was detected (at 305) is classified in the database 155. If it is determined (at 335) that the detected fault is not listed in the database 155, then the detected fault is classified (at 345) by, for example, a technician or other knowledgeable personnel. As mentioned, classifying (at 345) the detected fault, in one embodiment, may entail associating the detected fault with one or more of the processing tools 105 that processed the lot and thus may have caused the fault. In one embodiment, classifying (at 345) the detected fault may include identifying one or more operational parameters or settings in the processing tools 105 that should be monitored or adjusted to cure the fault.

If the fault detection module 125 determines (at 335) that the fault is classified in the database 155, then the fault detection module 125 provides (at 360) an error signal to the equipment interface 110 of the one or more identified (at 310) processing tools 105. As noted above, the processing tools 105 identified (at 310) may be one or more processing tools 105 that may have caused the fault that is detected (at 310) by the fault detection module 125. The error signal, in one embodiment, identifies the particular fault that is detected (at 305) by the fault detection module 125.

Figure 4:
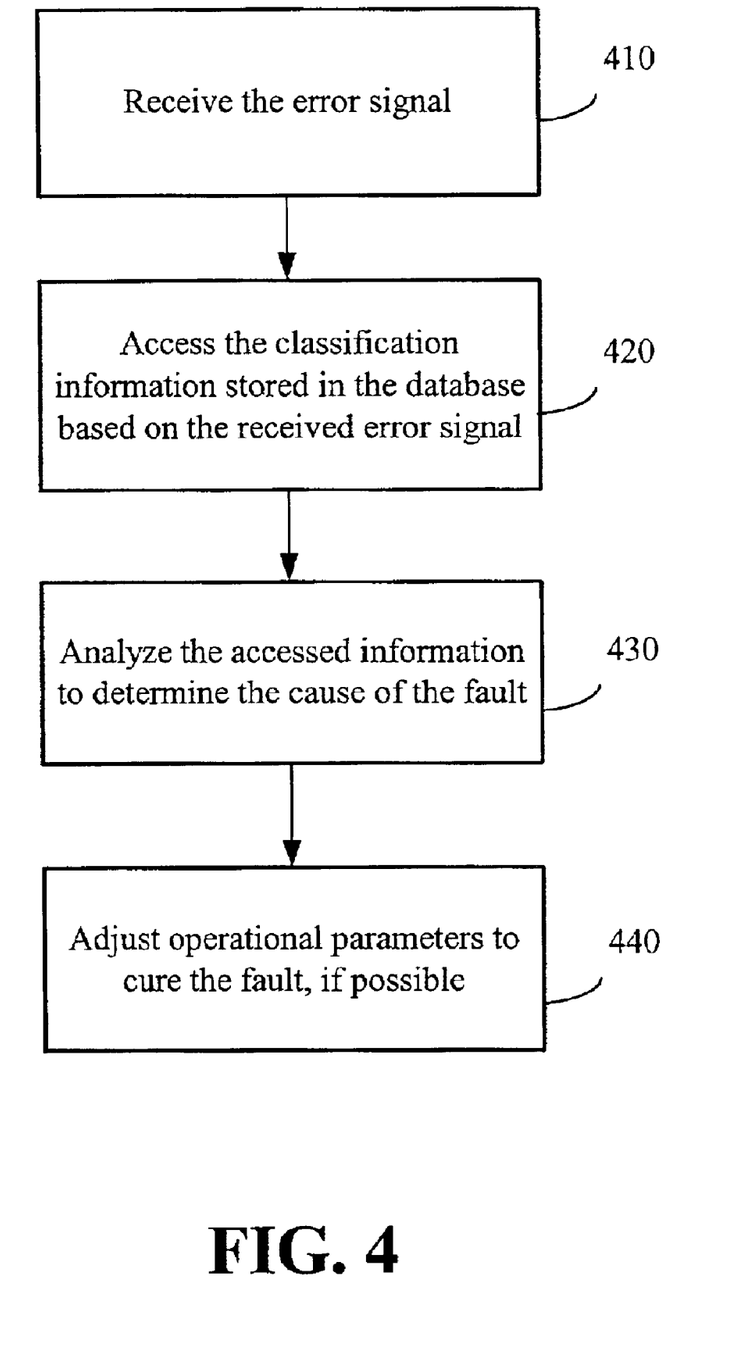
FIG. 4 depicts a flow diagram of a method that may be implemented in an equipment interface associated with the processing tool in the manufacturing system of FIG. 1, in accordance with one embodiment of the present invention While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

Referring now to FIG. 4, a flow diagram of the equipment analyzing module 270 of FIG. 2 is illustrated, in accordance with one embodiment of the present invention. The equipment analyzing module 270 of the one or more identified (at 310—FIG. 3) processing tools 105 is adapted to receive (at 410) the error signal that is provided (at block 360—FIG. 3) by the fault detection module 125. In one embodiment, the error signal may indicate the error that was detected (at 305—FIG. 3). In one embodiment, the error signal may represent a combination error signal that indicates that the fault represented by the error signal may have been caused by a combination of two or more processing tools 105. That is, while each processing tool 105, when considered individually, may have produced a lot of wafers within an acceptable range, the processing tools 105, when operating collectively on the lot of wafers, produce a fault.

The equipment analyzing module 270 accesses (at 420) the database 155 in the fault detection data processing unit 122 based on the error signal received (at 410) by the equipment interface 110. The equipment analyzing module 270 of the equipment interface 110 retrieves the classification information that is stored in the database 155 that is related to the fault that is identified by the received error signal. The equipment analyzing module 270 analyzes (at 430) the accessed classification information to determine the possible causes of the fault. In instances where a collective effort of the processing tools 105 may have resulted in the fault, the database 155 may reflect that various processing tools 105 may have contributed to the fault.

The equipment analyzing module 270 of the equipment interface 110 adjusts (at 440) one or more operational parameters of the associated processing tool 105 to cure the fault, if possible, based on the classification information accessed from the database 155. Adjusting (at 440) the one or more operational parameters of the processing tool 105 may include (depending on the nature of the error) adjusting parameters such as the light energy in a stepper tool, the shutter speed in a processing tool, and the like.

The various system layers, routines, or modules may be executable by the control units 121, 123 (see FIG. 1), 260 (see FIG. 2). As utilized herein, the term "control unit" may include a microprocessor, a microcontroller, a digital signal processor, a processor card (including one or more microprocessors or controllers), or other control or computing devices. The storage units 124 (see FIG. 1) referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   detecting a fault associated with processing of a workpiece in a manufacturing system having a plurality of processing tools;
   identifying at least one of the processing tools that processes the workpiece;
   accessing a database, wherein the database includes information associating one or more faults with one or more of the identified processing tools;
   determining at least one of the identified processing tools that may be associated with the detected fault based an at least a portion of the information stored in the database; and
   providing an error signal to the at least one of the determined processing tools to perform diagnostics based on the detected fault.

2. The method of claim 1, wherein each of the plurality of the processing tools comprises an associated equipment interface, wherein providing the error signal comprises providing the error signal to the equipment interface of the at least one of the determined processing tools.

3. The method of claim 1, further comprising performing corrective action based on performing the diagnostic.

4. The method of claim 3, wherein performing the corrective action comprises performing the corrective action based on a classification of the fault.

5. The method of claim 1, wherein detecting the fault comprises receiving operational data from one or more of the identified processing tools and comparing the operational data to fault model data.

6. The method of claim 1, wherein identifying the at least one of the processing tools comprises accessing a history module including a list of one or more of the plurality of the processing tools that process the workpiece.

7. The method of claim 1, wherein detecting the fault comprises receiving metrology data and determining that at least a portion oft he metrology data is not within an acceptable range.

8. An equipment interface of a processing tool, comprising:
   a storage unit; and
   a control unit communicatively coupled to the storage unit, the control unit adapted to:
   receive an error signal provided by a fault detection unit, wherein the error signal is indicative of an error condition associated with the processing tool of a manufacturing system;
   access information related to the error condition from a database, wherein the database includes information associating one or more error faults with one or more processing tools; and
   determine a possible cause of the error condition based on the accessed information.

9. The equipment interface of claim 8, wherein the control unit is adapted to perform diagnostics on the processing tool based on the accessed information.

10. The equipment interface of claim 8, wherein the error condition is associated with processing of a wafer by the processing tool.

11. The equipment interface of claim 8, wherein the error condition is based on a comparison of metrology data to an acceptable range of values.

12. The equipment interface of claim 8, wherein the error condition is based on a comparison of an operation data that is provided by the processing tool and fault model data.

13. The equipment interface of claim 8, wherein the database comprises entries regarding classification of the error condition.

14. The equipment interface of claim 8, wherein the control unit is adapted to receive the error signal over an APC framework and wherein the error signal is a combinational error signal.

15. An article comprising one or more machine-readable storage media containing instructions that when executed enable a processor to:
   receive an error signal provided by a fault detection unit, wherein the error signal is indicative of a fault associated with processing of a wafer in a processing tool;
   access information related to the fault from a database, wherein the database includes information associating one or more error faults with the processing tool; and
   perform diagnostics on the processing tool based on the accessed information.

16. The article of claim 15, wherein the instructions when executed enable the processor to perform corrective action to cure the fault indicated by the error signal.

17. The article of claim 15, wherein the instructions when executed enable the processor to determine the fault based on comparing operation data from tie processing tool to fault model data.

18. The article of claim 15, wherein the instructions when executed enable the processor to determine the fault based on metrology data associated with the wafer at is processed by the processing tool.

19. The article of claim 15, wherein the instructions when executed enable the processor to access the database to retrieve information related to a classification of the fault.

20. The article of claim 15, wherein the instructions when executed enable the processor to receive a combinational error signal indicating that the fault may have been due to at least two processing tools.

21. A system, comprising:
   a plurality of processing tools adapted to process a lot of wafers; and
   a fault detection data processing unit communicatively coupled to the plurality of processing tools over a framework, the fault detection data processing unit adapted to:
   receive metrology data based on the lot of wafers processed by at least one of the processing tools;
   detect a fault based on the received metrology data;
   identify one or more of the plurality of processing tools that processes the lot of wafers;
   access a database, wherein the database includes information associating one or more faults with one or more of the identified processing tools;
   determine at least one of the identified processing tools that may be associated with the detected fault based on at least a portion of the information stored in the database; and
   provide an error signal to the one or more of the determined processing tools based on the detected fault.

22. The system of claim 21, wherein each of the processing tools comprises an associated equipment interface, and wherein the fault detection data processing unit provides the error signal to the equipment interface of the one or more of the determined plurality of processing tools.

23. The system of claim 22, wherein the fault detection data processing unit comprises a database including a classification of the detected fault.

24. The system of claim 22, wherein the equipment interface performs diagnostics on the one or more of the determined plurality of processing tools.

25. The system of claim 22, wherein the equipment interface takes corrective action to cure the fault in at least one of the determined plurality of processing units.

26. An apparatus comprising:
   means or detecting a fault associated with processing of a workpiece in a manufacturing system having a plurality of processing tools;
   means for identifying at least one of the processing tools that processes the workpiece;
   means for accessing a database, wherein the database includes information associating one or more faults with one or more of the identified processing tools;
   means for determining at least one of the identified processing tools that may be associated with the detected fault based on at least a portion of the information stored in the database; and
   means for providing an error signal to the at least one of the determined processing tools to perform diagnostics based on the detected fault.

* * * * *